Sept. 12, 1967   R. K. BOGUE   3,341,834
ALTERNATING CURRENT ELECTROMAGNETIC INSTRUMENT
Filed May 17, 1965   3 Sheets-Sheet 1
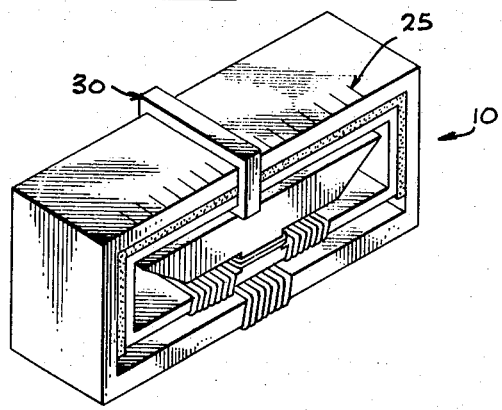
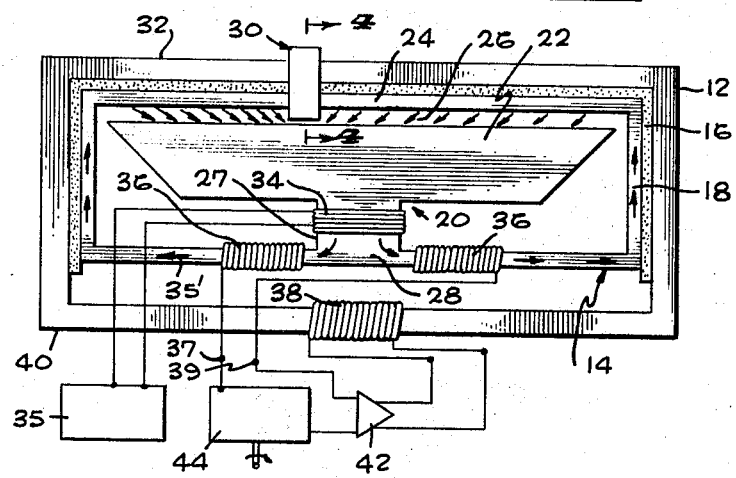
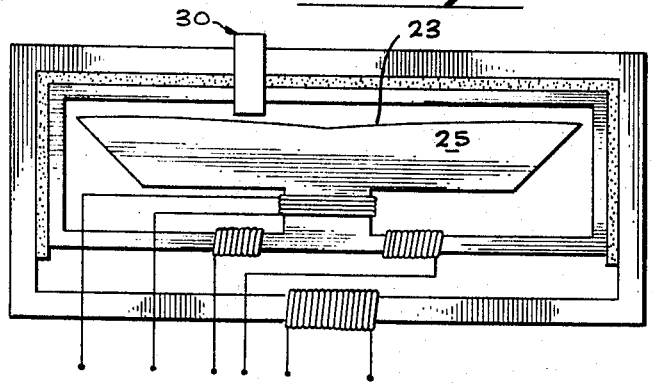
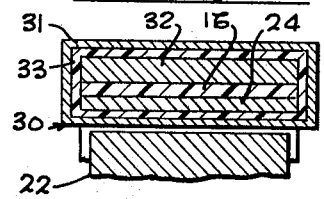
RODNEY K. BOGUE
INVENTOR
BY J. McCoy
Charles C. Wells
ATTORNEYS Sept. 12, 1967  R. K. BOGUE  3,341,834
ALTERNATING CURRENT ELECTROMAGNETIC INSTRUMENT
Filed May 17, 1965  3 Sheets-Sheet 2

INVENTOR
RODNEY K. BOGUE
BY  G. McCoy
Charles C. Wells
ATTORNEYS

Sept. 12, 1967  R. K. BOGUE  3,341,834
ALTERNATING CURRENT ELECTROMAGNETIC INSTRUMENT
Filed May 17, 1965  3 Sheets-Sheet 3
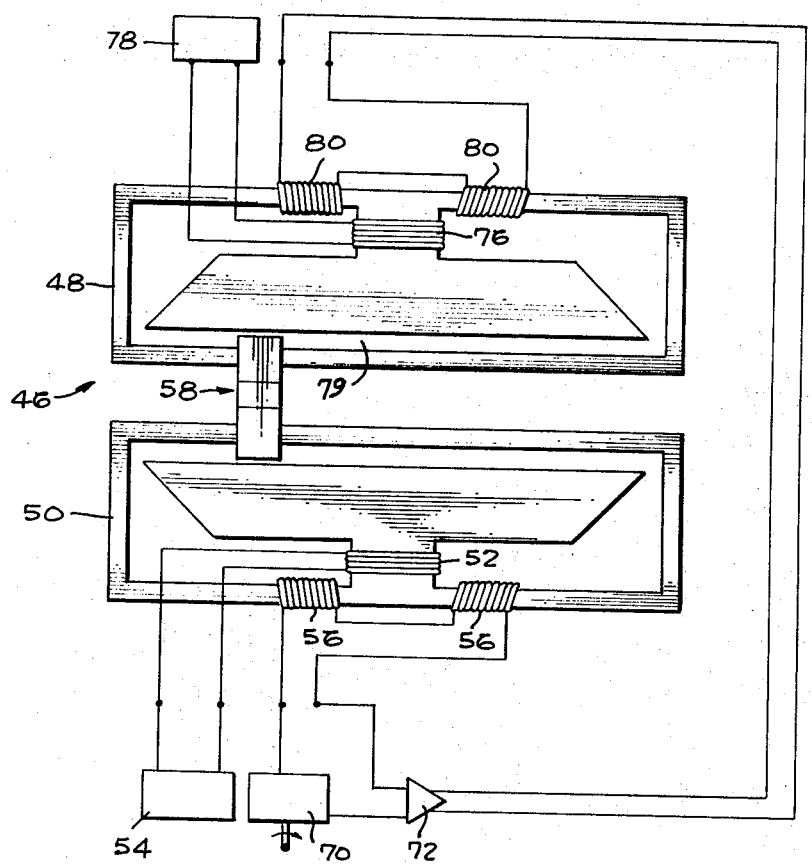
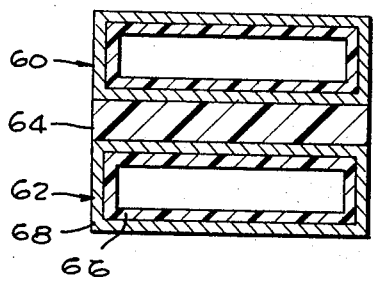
RODNEY K. BOGUE
INVENTOR.
BY  G. McCoy
Charles C. Wells
ATTORNEYS United States Patent Office 3,341,834
Patented Sept. 12, 1967

3,341,834
ALTERNATING CURRENT ELECTROMAGNETIC
INSTRUMENT
Rodney K. Bogue, P.O. Box 2251, Edwards Air
Force Base, Calif. 93523
Filed May 17, 1965, Ser. No. 456,582
8 Claims. (Cl. 340—199)

The invention described herein may be manufactured and used by or for the Government of the United States of America for governmental purposes without the payment of any royalties thereon or therefor.

This invention relates generally to alternating current electromagnetic servo devices and more particularly it relates to an electromagnetic device that functions as a simple and reliable display instrument for the cockpit of a flight research aircraft.

Prior art display devices or instruments of this type while satisfactory, have generally been relatively complex devices that included a plurality of moving parts such as an electric motor, a gear train driven by the motor and a tape or other linearly reading scale apparatus driven by the motor. A malfunction in any one of these moving parts results in the instrument becoming inoperative or, at least inaccurate. These prior art devices in addition to being quite intricate and complex are larger and heavier and thus occupy space and add weight to a vehicle in which space and weight factors are critical.

This is particularly true in high performance research aircraft which are presently being used extensively to study supersonic flight in the outer fringes of the earth's atmosphere. This type of aircraft is heavily instrumented and any savings in the size of cockpit instrumentation is important.

It is believed therefore to be obvious that any improvement in flight instruments which overcome the above discussed disadvantages, particularly a device having an increased reliability, would be very useful and valuable.

An instrument constructed in accordance with the principles of this invention overcomes the disadvantages discussed heretofore by providing an electromagnetic device which operates in conjunction with sensor devices located on a research aircraft. The sensor device senses conditions encountered by the aircraft and converts the condition sensed into an appropriate electrical signal. The signal generated by the sensor device is amplified and fed to excitation coils in the instrument. The instrument includes two magnetic core members and a slider device which functions in conjunction with the two magnetic core elements. The slider device which normally slides along a scale, includes a conductor which forms a coil having a single turn and this single turn coil encircles the magnetic cores. When the excitation windings are energized the magnetic fields and induced current flow which results therefrom generates a force upon the slider which moves the slider to a position indicative of the condition sensed by the sensor.

It is a principal object of this invention to provide improved and simplified instrumentation for a research aircraft.

Another object of this invention is to provide an electromagnetic instrument which is simple and reliable and has only a single moving part.

A further object of this invention is to provide a simplified flight display instrument having a nonlinear readout capability.

Other objects and advantages of this invention will become more apparent when considering the following detailed description in conjunction with the accompanying drawings wherein:

FIG. 1 is a pictorial view of an electromagnetic instrument constructed in accordance with the present invention;

FIG. 2 is a view in elevation of the instrument with a schematic showing of electrical apparatus used in conjunction with the instrument.

FIG. 3 is a view in elevation of an instrument constructed so as to have a nonuniform airgap and thus provide a nonlinear readout capability.

FIG. 4 is a view in cross-section of the slider;

FIGS. 4a through 7c are schematic illustrations of the phase angle relationships of the magnetic flux and induced currents and the resultant force exerted on the slider;

FIG. 8 is an alternate embodiment of the instrument for use in applications that require large excitation currents;

FIG. 9 is a view in cross-section of the slider employed in the alternate embodiment.

Figure 4A:
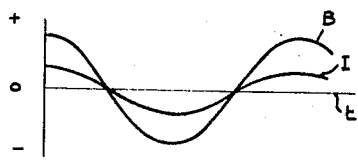

Referring now to FIGS. 1 and 2 of the drawing wherein an electromagnetic instrument 10 is illustrated. The instrument comprises a first magnetic circuit that includes an outer magnetic core 12 in the form of a hollow rectangle. A second magnetic circuit is formed by an inner core member 14 arranged within core 12 and insulated magnetically therefrom by a layer of insulating material 16 interposed between the two core members. Core member 14 includes a first hollow rectangular portion 18 nested within the outer magnetic core and a T-shaped portion 20 connected to rectangular portion 18. The T-shaped portion of the inner core member includes a horizontal member 22 which is disposed closely adjacent to an upper side 24 of rectangular core member 18 to define a space 26 therebetween which forms an airgap. The T-shaped portion also includes a vertical member 27 integral with core member 22 and the lower side 28 of the hollow rectangular portion 18. A slider 30, in the form of a hollow rectangle, surrounds upper sides 24 and 32 of the inner and outer magnetic core elements and extends through airgap 26. The slider consists of an outer rectangular member 31 composed of copper or some other suitable conductive material and an inner rectangular member 33 composed of Teflon or other insulating material having characteristics which permits relatively easy sliding on the magnetic core members. The upper surface of outer magnetic core member 12 can be provided with a suitable scale 25 so as to give a viewer a visual indication, by noting the position of the slider with respect to the scale, of the condition being monitored. The scale can be of any type desired and the particular type of scale used would be determined by the condition being monitored.

Vertical member 27 of the inner core member has a coil 34 mounted therearound and this coil is excited by an A.C. power source 35. The signal delivered to coil 34 is maintained at a constant frequency and magnitude. Coil 34 generates a flux flow in the inner magnetic core member in a direction illustrated by arrows 35'; however, since the signal applied to coil 34 is constantly reversing the flux flow in the inner magnetic core is also constantly reversing in direction. The flux flow around the inner core includes a flow across the airgap 26 which results in a reversing magnetic field being created in airgap 26. Member 31 of slider 30 forms a flux barrier and effectively divides the inner magnetic circuit into two halves. The flux flow through each half of the circuit is controlled by the length of its airgap and the length of the airgap is in turn controlled by the position of the slider.

A second coil 36 is disposed around the lower side 28 of a core member 18. This coil consists of an equal number of turns positioned on each side of vertical member 27 of inner core member 18. The reversing flux flow through core member 18 results in a reversing current flow being induced in coil 36. Inasmuch as the two sides of coil 36 are connected in series opposition and the induced current flow in each side of the coil is opposite in direction to the other side, there will result a current flow in each side of the coil 36 that has opposite polarity to the flow in the other side. As mentioned heretofore, the density of the flux flow through each half of magnetic core member 19 is determined by the position of slideable element 30 which controls the length of the airgap for each half of the inner magnetic circuit. The flux flow in each half of the circuit controls the amount of current flow induced in each side of coil 36 and since the two induced currents will be in opposition the output at the terminals of coil 36 will be determined by and indicative of the position of slider 30.

A coil means 38 is mounted around lower side 40 of outer magnetic core member 12 and this coil is excited by an AC signal delivered by amplifier 42. Coil 38 when excited generates an alternating flux flow in the outer magnetic core member and this alternating flux flow induces an alternating flow of current in conductor 31.

Sensor mechanism 44 can be a synchro, i.e., a device for monitoring the angular position of a rotatable shaft, or any other type of sensor whose output is an alternating electric signal that varies in magnitude with a change in the condition sensed. The sensor mechanism is electrically connected to terminal 37 of coil 36 and also to one input terminal of amplifier 42. Terminal 39 of coil 36 is connected to the other input of amplifier 42 and the output of amplifier 42 is connected to coil 38 so as to provide excitation current therefor.

As discussed heretofore the amount of flux flowing through each side or half of core member 18 is determined by the position of slider 30 which forms a flux barrier. When the slider is in the position illustrated in FIG. 2 the flow through the right side of core member 18 is greater than through the left side of the core member.

As illustrated in FIG. 2, the induced current flow in coil 36 would be the greatest in the right side of the coil. The polarity of the signal delivered to terminals 37 and 39 would be the same as the current induced in the right side of the coil and the magnitude of the output at terminals 37 and 39 would be the output of the right side of the coil minus the output of the left side of the coil. The output of coil 36 is connected into sensor 44 and amplifier 42 in such manner that the signal from the coil and sensor are effectively compared and a signal is fed into amplifier 42 that is proportional to the amount of correction needed in the position of slideable element 30 to give a true indication of the condition sensed by sensor 44. For example, if the sensor 44 were an angle of attack sensing device on an aircraft and the aircraft suddenly went into a dive then the signal from the sensor would change while the signal from coil 36 would remain the same. Since the sensor and coil are connected such that their outputs either oppose or reinforce one another, the signal fed to amplifier 42 changes when the output of sensor 44 changes. This in turn results in a change in the amplified excitation signal fed to coil 38. When coil 38 is excited a reversing flux flow is generated in outer core member 12 and this flux flow induces a current flow in conductor member 33 forming a part of slider 30. The induced current flows through the portion of conductor 31 extending through the magnetic field in the airgap and this induced current flowing in a magnetic field results in a force being applied to the slider that moves it to a position that corresponds to the condition sensed by the sensor. It should be understood that calibration of the various components of the invention is required to achieve the results discussed above.

The force exerted on the slideable element 30 is given by the equation:

$$F = BIL[\cos(4\pi f + \phi) + \cos(-\phi)]$$

where:

$F$ = force applied to slider 30
$B$ = magnetic flux density in airgap
$I$ = current induced in the conductor 31
$L$ = length of conductor in the airgap (magnetic field)
$\phi$ = phase angle difference between the magnetic flux in the airgap and the induced current flow in conductor 31
$f$ = frequency.

As is apparent from considering the above equation, the force exerted on the slider is directly proportional to the flux density in the airgap, the induced current flowing in the conductor, the length of the conductor passing through the airgap and the phase angle relationship of the magnetic flux in the airgap and the induced current flow in conductor 31. The frequencies of the several excitation currents are maintained equal and the magnitude and direction of the force exerted on the slider is varied only by changing the phase angle and magnitude of the excitation current fed to coil 38. How this is accomplished and the resultant force that is generated will be described hereafter with reference to FIGS. 4 through 7, which illustrate how changing the phase angle of the current in conductor 31 affects the magnitude and direction of the force exerted on slideable element 30.

Figure 4B:
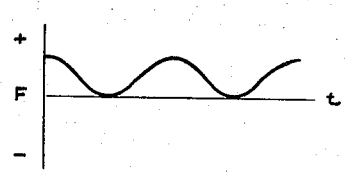
Figure 4C:
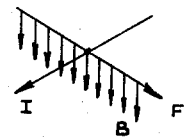

Referring to FIG. 4a, two curves are shown which illustrate the phase relationships of the flux B in the airgap and the induced current I flowing in conductor 31. In this instance the two curves are in phase so that phase angle difference is zero. The cosine of 0° is 1 and thus the force exerted on the slider would be at a maximum when the flux and induced current are in phase. The force which results in this instance is shown in FIG. 4b and while the force varies in magnitude it remains in the positive direction which means that the force is exerted in one direction only. FIG. 4c illustrates the direction of the flux in the airgap, the induced current in conductor 33, and the resultant force applied at a time when time ($t$) is 0. B and I are constantly changing direction since the excitation current that generates them is an alternating current. However, since B and I are in phase they change from a positive value to a negative value simultaneously and thus the force F does not change direction. In instances discussed hereafter where the phase relationship of B and I is such that B and I are both positive and then either B or I goes negative, with the other remaining positive, then the force F does change direction.

Figure 5A:
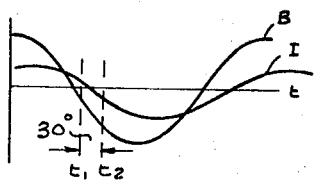
Figure 5B:
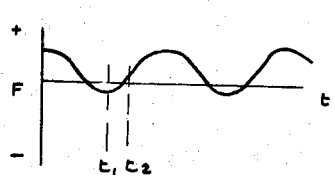
Figure 5C:
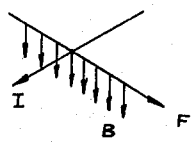

In FIG. 5a the induced current I leads the flux B in the airgap by approximately 30°. Thus, at a time when $t$ is 0 the force is positive. However, at a time $t_1$, when I is positive and B is negative then the force F goes negative (or changes direction). At a time $t_2$, when both I and B have gone negative, the force F again goes positive or changes direction. The average force in this instance would, however, be positive. FIG. 5c illustrates the direction of the flux B, induced current I and the force F at a time when $t$ is 0.

Figure 6A:
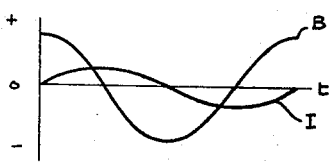
Figure 6B:
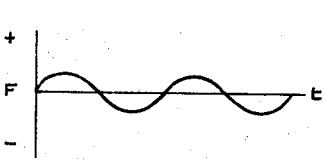
Figure 6C:
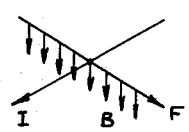

FIG. 6b illustrates the force developed when B and I are 90° out of phase as illustrated in FIG. 6a. It is apparent from FIG. 6b that the net force applied to the slider would be zero since the force is rapidly reversing direction. If the mass of slideable element 30 were small enough then a rapid wiggle might be imparted thereto by the constantly reversing force. However, in practice, the mass of the slidable element is made great enough so that the small forces exerted will not move the slideable element.

Figure 7A:
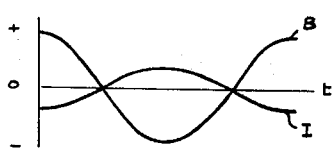
Figure 7B:
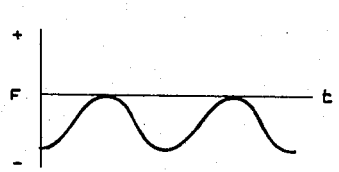
Figure 7C:
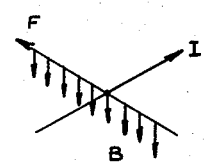

FIG. 7a illustrates the situation when B and I are 180° out of phase. In this phase relationship B is always negative when I is positive and vice versa, except when the magnitude of each is zero. The force which results from this phase relationship remains in the negative direction. Again, in FIG. 7c, the direction of the various components is illustrated at time when $t$ is zero.

The instrument as illustrated in FIG. 3 is identical to FIG. 2 except that upper surface 23 of vertical member 25 has been formed with a slight curvature so as to provide a nonuniform or varying airgap. The varying airgap provides the instrument with a nonlinear readout capability. Vertical member 22 can have any curvature desired in order to permit a scale graduation deemed necessary. For example, with the curvature illustrated in FIG. 3, a scale such as that indicated by 25 in FIG. 1 could have condensed graduations at each end of the scale, but the middle graduations would be relatively widely spaced. Such a scale graduation would allow a precise indication of critical conditions and a more approximate indication of less critical conditions. This is assuming of course that the instrument is originally calibrated so that the critical condition will be read on the middle portion of the scale.

An alternate embodiment of the invention is illustrated in FIG. 8 and this modified instrument operates on the same principles as the instrument discussed heretofore. The magnetic circuits employed in this alternate embodiment are separated in order to eliminate any interference effects between the two circuits when large current are employed to excite the magnetic cores.

Instrument 46 is composed of two identical magnetic cores 48 and 50 which have the same configuration as the previously discussed inner magnetic core 14. An alternating flux flow is generated in core 50 by coil 52 which is excited by A.C. power source 54 having a constant output. Coil 56 operates in the same manner as coil 36 discussed above and the magnitude and polarity of its output depends upon the position of slider 58. Slider 58 consists of two hollow rectangular members 60 and 62 mechanically coupled together by a block 64 of insulating material. Each of the rectangular members have an inner portion 66 composed of an insulator material and an outer portion 68 composed of a conductor material. The outer conductor portions extend through the airgaps formed by each core and thus forms a flux barrier. The position of the flux barrier would, as discussed heretofore, control the amount of flux flowing through each half of magnetic core 50.

The output of coil 56 is connected to a sensor device 70 and amplifier 72 in such manner that the signal from the coil and sensor are compared. If the slider is in a proper position for the condition sensed by the sensor then the signals from coil 56 and sensor 70 will cancel one another and no error signal will be fed into amplifier 72. However, as discussed above, if slider position correction is needed then a signal will be fed into amplifier 42.

It is believed apparent that the magnetic circuit made up of core 50 and its associated apparatus functions to determine the position of slider 58. The magnetic circuit that includes core 48, which will be discussed below in more detail, functions to generate a force on the slider to move it to a different position when required.

Coil 76 is excited by a constant output A.C. power source 78 to generate a reversing flux flow in core 48 and the flux flow through airgap 79 generates a magnetic field therein. When an amplified error signal from amplifier 72 is applied to coil 80 a flux flow is developed around the outer rectangular portion of core 48 which induces a current flow in the conductor portion of slider 58 extending through airgap 79. This induced current flowing in a magnetic field results in a force being applied to the slider to move it to a position indicative of the condition being sensed by sensor 54. Inasmuch as the effect of the phase angle relationship of the magnetic field and the induced current flow in the conductor on the magnitude and direction of the force applied the slider was discussed previously in some detail it will not be discussed further.

This completes the description of the drawing and while two preferred exemplary embodiments of the invention have been described herein it is to be understood that there will be many changes and modifications thereto which can be made by one skilled in the art to which this invention pertains without departing from the spirit and scope of the invention as defined by the appended claims.

What is claimed is:
1. An electromagnetic device of the character described comprising:
 (a) a first hollow magnetic core member,
 (b) a second magnetic core member, mounted within said first magnetic core member,
 (c) said second magnetic core member including spaced elements which provide an airgap,
 (d) slideable means that includes a single turn of conductive material disposed around said first and second core members and extending through the airgap, and
 (e) means electrically connected to said first and second core members for sensing the position of said slideable means and causing a force of a desired magnitude and direction to be exerted on said slideable means.

2. The device recited in claim 1 wherein said means include:
 (a) a first alternating current excited coil connected around said second magnetic core member for generating a reversing flux flow therein and a reversing magnetic field in the airgap,
 (b) a second coil connected around said second magnetic core whose output is indicative of the position of said slideable means, and
 (c) a third alternating current excited coil connected around said first magnetic core member for generating a flux flow in said first magnetic core member to thereby induce a flow of current in said slideable means.

3. An electromagnetic device of the character described comprising:
 (a) a first magnetic circuit that includes a first hollow rectangular core member and a first means connected to said first core member for generating a reversing magnetic flux flow therein,
 (b) a second magnetic circuit that includes a second core member mounted within said first core member, said second core member including spaced elements that form an airgap, said second magnetic circuit further including a second means connected to said second core member for generating a reversing flux flow in said second core member whereby a reversing magnetic field is created in the airgap,
 (c) a slideable element mounted around said first and second core members and extending through the airgap formed by said second core member, said slideable element including a continuously extending conductor which forms a coil having a single turn, whereby said conductor will have a flow of electrical current induced therein by the reversing magnetic flux in said first core member, and further the induced current flow, in conjunction with the magnetic field created in the airgap, will result in a force being applied to the slideable element.

4. An electromagnetic servosystem comprising:
 (a) an outer rectangular core member that forms a first magnetic circuit,
 (b) an inner magnetic core member that forms a second magnetic circuit, said inner core member including a rectangular portion that nests within said outer rectangular core member and a T-shaped portion disposed within said rectangular portion, said T-shaped portion having a horizontal member that closely parallels one side of said rectangular portion to form an airgap therebetween and a vertical member, connected to said horizontal member and a second side of said rectangular portion,
(c) a rectangular slideable element that surrounds a side of said outer core member and the one side of the rectangular portion of said inner core member so as to extend through the airgap, said slideable element including a continuous conductor that forms a single turn coil,
(d) a first alternating current excited coil connected around the vertical member of said inner core member for generating a reversing flux flow in said inner magnetic core member and thereby creating a magnetic field in the airgap,
(e) a second alternating current excited coil connected around one side of said outer core member for generating a reversing flux flow through said outer core member and inducing a current flow in the single turn coil whereby a force will be exerted on said slideable element,
(f) a third coil mounted around the hollow rectangular portion of said inner core member whose output is indicative of the position of said slideable element, and
(g) means connected between said second and third coils for adjusting the phase angle of the alternating current applied to said second coil whereby a force of a desired magnitude and direction will be applied to said slideable element and thereby move it to a desired position.

5. An electromagnetic servosystem for sensing aerodynamic conditions encountered by a flight vehicle and providing a visual indication of the sensed conditions, said servosystem comprising:
(a) a synchro means mounted in the flight vehicle that senses an aerodynamic condition encountered by the vehicle and generates an alternating current signal in response thereto, and
(b) an electromagnetic instrument means mounted in said flight vehicle and electrically connected to said synchro means for providing a visual indication of the condition sensed by said synchro means, said instrument means including:
 (1) a first magnetic circuit that includes a first core member having a configuration like that of a hollow rectangle,
 (2) a second magnetic circuit that includes a second core member nested within said first core member, said second core member including a first portion shaped like a hollow rectangle and a second T-shaped portion disposed within and integral with said first portion, said T-shaped portion having a horizontal member that forms an airgap with a first side of said first portion and a vertical member connected to a second side of said first portion,
 (3) a rectangular shaped slideable element that surrounds a first side of said first core member and the first side of said second core member to extend through the airgap, said slideable element including a continuous conductor that forms a single turn coil extending through the airgap formed by said second core member,
 (4) a first alternating current excited coil connected around the vertical member of the T-shaped portion for generating an alternating flux flow in said second core member and an alternating magnetic field in said airgap,
 (5) a second coil mounted around the second side of said second core member and connected to said synchro means and an amplifier, said second coil having an equal number of turns positioned on each side of the vertical member of said T-shaped portion, said second coil having a current flow induced therein by the reversing flux flow and the polarity and magnitude of the induced current is dependent upon the position of the slideable element in the airgap.
 (6) a third coil connected to the amplifier and said second coil and energized by the signal from the amplifier, said third coil generating a reversing flux flow in said first magnetic circuit which induces an alternating current flow in the continuous conductor mounted in said slideable element, whereby said slideable element will, due to the presence of the magnetic field in the airgap and the induced current flow in the continuous conductor, have a force exerted thereon which moves the slideable element to a position indicative of the condition sensed by said synchro means.

6. An electromagnetic device of the character described comprising:
(a) a first magnetic core member,
(b) a second magnetic core member positioned adjacent said first magnetic core member,
(c) said first and second core members each including spaced elements which form an airgap,
(d) a slideable element mounted on said first and second core members that encircle a side of said core members and extend through the airgaps formed thereby, and
(e) means electrically connected to said first and second core members for sensing the position of said slideable element and causing a force of a desired magnitude and direction to be exerted on said slideable element.

7. An electromagnetic device of the character described comprising:
(a) a first magnetic circuit that includes a first magnetic core member, said first core member including a hollow rectangular portion and a T-shaped portion disposed therein, said T-shaped portion including an elongated member disposed in a closely spaced relation to one side of said hollow rectangular portion to form an airgap therebetween, said T-shaped portion further including a second member connected between said elongated member and a second side of said rectangular portion,
(b) a second magnetic circuit having a second magnetic core member that is identical in configuration to said first magnetic core member, said second magnetic core member being disposed adjacent to said first magnetic core member and in a position such that the airgaps formed by each core member will parallel one another,
(c) a slideable element mounted around the sides of the hollow rectangular portions of the first and second magnetic core members adjacent the airgaps, said slideable element comprising a pair of mechanically coupled rectangular members that encircle the sides of the rectangular portions of said first and second core members and extend through the airgaps formed thereby, said pair of rectangular members each including an inner portion composed of insulator material and an outer portion composed of a conductor material,
(d) excitation means connected to said first and second magnetic circuits for generating a reversing flux flow therein and thus creating a reversing magnetic field in the airgaps formed by said first and second magnetic core members,
(e) a first coil means mounted on said first magnetic core member whose output is controlled by the position of said slideable element, (f) a second coil means mounted on said second magnetic core member and adapted to be excited by an alternating current to develop a flux flow in said second magnetic core member and thereby induce a current flow in said slideable element whereby a force will be developed for moving said slideable element.

8. The electromagnetic device recited in claim 7 which further includes:

(a) means connected between said first and second coil means for generating an error signal in the form of an alternating current that excites said second coil means when repositioning of the slideable element is required.

No references cited.

NEIL C. READ, *Primary Examiner.*

THOMAS B. HABACKER, *Examiner.*